(12) United States Patent
Zhu et al.

(10) Patent No.: US 9,734,955 B2
(45) Date of Patent: Aug. 15, 2017

(54) ELECTRODE MATERIAL, PREPARATION METHOD THEREOF AND SUPERCAPACITOR BASED THEREOF

(71) Applicant: SICHUAN UNIVERSITY, Sichuan (CN)

(72) Inventors: Jiliang Zhu, Sichuan (CN); Ping Sun, Sichuan (CN); Zhongxing Wang, Sichuan (CN); Zifan Zeng, Sichuan (CN); Qingyuan Wang, Sichuan (CN); Juncheng Zhu, Sichuan (CN)

(73) Assignee: SICHUAN UNIVERSITY, Sichuan (CN)

( * ) Notice: Subject to any disclaimer, the term of this patent is extended or adjusted under 35 U.S.C. 154(b) by 171 days.

(21) Appl. No.: 14/425,312

(22) PCT Filed: Jan. 14, 2013

(86) PCT No.: PCT/CN2013/070430
§ 371 (c)(1),
(2) Date: Mar. 2, 2015

(87) PCT Pub. No.: WO2014/032404
PCT Pub. Date: Mar. 6, 2014

(65) Prior Publication Data
US 2015/0235775 A1 Aug. 20, 2015

(30) Foreign Application Priority Data

Aug. 28, 2012 (CN) .......................... 2012 1 0310094
Aug. 28, 2012 (CN) .......................... 2012 1 0310195

(51) Int. Cl.
| | | |
|---|---|---|
| *H01G 11/44* | (2013.01) | |
| *H01G 11/84* | (2013.01) | |
| *H01G 11/30* | (2013.01) | |
| *H01G 11/86* | (2013.01) | |
| *H01G 11/56* | (2013.01) | |
| *H01G 11/68* | (2013.01) | |

(52) U.S. Cl.
CPC ............. *H01G 11/30* (2013.01); *H01G 11/56* (2013.01); *H01G 11/68* (2013.01); *H01G 11/86* (2013.01)

(58) Field of Classification Search
CPC ......... H01G 11/44; H01G 11/30; H01G 11/22
USPC ....................................................... 361/502
See application file for complete search history.

(56) References Cited

FOREIGN PATENT DOCUMENTS

| CN | 102157354 A | 8/2011 |
|---|---|---|
| CN | 201210310195 | 8/2012 |
| CN | 102842433 A | 12/2012 |
| CN | 102842437 A | 12/2012 |
| JP | 2011228048 A * | 11/2011 |

OTHER PUBLICATIONS

International Search Report for International Application No. PCT/CN2013/070430 mailed May 23, 2013.

* cited by examiner

*Primary Examiner* — Eric Thomas
(74) *Attorney, Agent, or Firm* — Koppel, Patrick, Heybl & Philpott (57) ABSTRACT

The disclosure discloses electrode material, preparation methods thereof and supercapacitors based thereof. Raw material for preparing the electrode material include PVDF and an additive which can be reacted with the PVDF to generate conductive active substance, the amount of the PVDF is 50 to 99 mass percentage, and the amount of the additive is 1 to 50 mass percentage. A PVDF-based composite film can be prepared from the raw materials; and activating treatment is performed on the film by virtue of a physico-chemical process, so that PVDF can generate a conductive active substance, the contact resistance of the PVDF and the active substance is reduced, and the conductive active substance is distributed in the PVDF-based composite film more uniformly. Button and wound supercapacitor and flexible capacitor, which are prepared from the electrode material, are high in power density and energy density, long in cycle life.

19 Claims, 5 Drawing Sheets

ELECTRODE MATERIAL, PREPARATION METHOD THEREOF AND SUPERCAPACITOR BASED THEREOF

TECHNICAL FIELD

The disclosure relates to the technical field of electrode material and capacitor preparation, in particular to electrode material, a preparation method thereof and supercapacitors based thereof.

BACKGROUND

Supercapacitor is a novel energy storage device, and becomes one of hot spots in novel chemical power researches by virtue of high power, high energy conversion efficiency and high cycle performance. The supercapacitor is a novel environment-friendly and irreplaceable energy storage and energy saving device between conventional capacitor and rechargeable battery; and compared with the conventional capacitor, the supercapacitor has the characteristics of high charging and discharging speed, long cycle life, no pollution, wider working temperature range, frequent usage and the like, and also has an energy storage mechanism of an electrochemical battery. Precisely because of the characteristics, more and more attention is paid to the application of the supercapacitor to the fields of electric vehicles, communication, consumer and entertainment electronics, signal monitoring and the like, such as communication equipment like audio-video equipment, a Personal Digital Assistant (PDA), a telephone set, a fax machine and a computer and a household electric appliance. It should particularly be noted that a vehicle supercapacitor can meet a requirement of high power to protect a main storage battery system during the acceleration, starting and climbing of a vehicle, which improves the development of the supercapacitor to a new level. The supercapacitor appears to conform to a requirement of era development, involves multiple subjects such as materials, energy, chemistry and electronic components, becomes one of hot spots of interdisciplinary researches, and is expected to become novel green power in this century.

At present, electrode materials for the supercapacitor mainly include activated carbon materials, conductive polymers and composite materials thereof, and transition metal oxides and composite electrode materials thereof. An activated-carbon-based supercapacitor has a longer research history, is currently higher in commercialization degree and the most technologically mature, but is complex in production process, long in production cycle and low in specific capacity; it is reported that a conductive polymer supercapacitor can show high energy density, but its cycle life is much lower than that of a carbon/carbon supercapacitor and a metal oxide supercapacitor; and although extremely high energy density and power density can be achieved by metal oxides, hydrous metal oxides (such as ruthenium oxide) and carbon nanotubes, the cost of supercapacitors manufactured from these materials is much higher than that of supercapacitors manufactured from other materials. Therefore, it is necessary to develop a low-cost electrode material with greatly improved performance for button supercapacitor and wound supercapacitor.

In addition, the energy storage of the supercapacitor is implemented by adopting a porous electrode with a large specific surface area and storing energy between its double diffusion layers. Capacitance generated during charging includes: double-layer capacitance generated by the directional arrangement of electrons and ions or dipoles on an electrode/electrolyte solution interface; or electrode charging potential-related pseudocapacitance generated by the underpotential deposition and highly-reversible chemical adsorption, desorption or oxidation-reduction reaction of an electroactive substance in a two-dimensional or quasi-two-dimensional space in a surface or bulk phase of the electrode. The performance of the supercapacitor is related to the electrode material, electrolyte and employed separator, and the electrode material is the most important factor because the performance of the electrode material directly affects the performance of the supercapacitor. Currently electrode material mainly include carbon material, metal oxide and polymer material. The carbon material with higher electrical conductivity and large specific surface area is used for double-layer capacitor; and the metal oxide and polymer with higher Faradic current generated by oxidation-reduction reaction in charging and discharging processes are used for pseudocapacitor. With the limitation of the electrode material and electrolyte, currently used supercapacitors have higher requirements on the packaging of devices, and the devices are larger in size. In order to meet the requirements of miniaturization, integration and modularization of the devices at present, solid-state flexible supercapacitor appears. The solid-state flexible supercapacitor adopts a solid-state electrolyte and electrode material which is generally a flexible thin film, so that the requirements on packaging are not high, the size is remarkably reduced, and the requirements of thinness, small size and light weight of the market on the devices are met.

SUMMARY

The disclosure aims to provide an electrode material, a preparation method thereof and supercapacitors based thereof, so as to provide a low-cost (Polyvinylidene Fluoride) PVDF-based electrode material made from readily available raw materials by a simple preparation process.

In order to achieve the purpose, according to one aspect of the disclosure, an electrode material is provided. Raw materials for preparing the electrode material include Polyvinylidene Fluoride (PVDF) and an additive, the additive can be reacted with the PVDF to generate a conductive active substance, wherein the amount of PVDF is 50 to 99 mass percentage, and the amount of the additive is 1 to 50 mass percentage.

Furthermore, the additive is one selected from potassium salt, potassium hydroxide and a strong oxidizing substance.

According to another aspect of the disclosure, a preparation method for an electrode material is provided. The preparation method includes the following steps: (1) dissolving PVDF and an additive to obtain a mixed solution by virtue of an organic solvent, the additive can be reacted with PVDF to generate a conductive active substance, wherein based on the sum of the polyvinylidene fluoride and the additive, the amount of PVDF is 50 to 99 mass percentage, and the amount of the additive is 1 to 50 mass percentage; (2) coating a substrate with the mixed solution obtained in the step (1), and drying the mixed solution to prepare a PVDF-based composite film; and (3) performing an activating treatment on the PVDF-based composite film obtained in the step (2) to obtain the electrode material.

Furthermore, the step (1) includes: uniformly mixing PVDF and the additive to obtain mixed powder, and dissolving the mixed powder to obtain the mixed solution by virtue of the organic solvent.

Furthermore, the additive is one selected from potassium salt, potassium hydroxide and a strong oxidizing substance.

Furthermore, the organic solvent is one or more selected from N,N-Dimethyl formamide (DMF), dimethyl sulfoxide (DMSO) and N-Methyl pyrrolidone (NMP).

Furthermore, the activating treatment includes the following steps: performing a heat treatment on the PVDF-based composite film for 1 to 120 minutes at 80° C. to 250° C., then impregnating the PVDF-based composite film in an aqueous solution or alcoholic solution for 1 to 600 minutes, the aqueous solution or alcoholic solution is a solution of potassium hydroxide, sodium hydroxide, lithium hydroxide or potassium permanganate, and finally performing a heat treatment on the PVDF-based composite film for 1 to 120 minutes at 80° C. to 250° C.

Furthermore, the aqueous solution or alcoholic solution of potassium hydroxide, sodium hydroxide, lithium hydroxide or potassium permanganate is at a concentration of 0.5 to 17.5 mol/L.

Furthermore, the activating treatment includes the following step of: depositing one or more metal selected from Au, Ag, Al, Fe and Ni on the PVDF-based composite film.

Furthermore, a film sputtering deposition method is used for depositing one or more metal selected from Au, Ag, Al and Fe on the PVDF-based composite film; or an electroplating method is used for depositing one or more metal selected from Ag, Ni, Fe and Cu on the PVDF-based composite film.

Furthermore, a material of the substrate is one selected from graphite paper, carbon paper, conductive fibre cloth, aluminium foil, nickel foam, copper foil and glass.

According to another aspect of the disclosure, a supercapacitor is provided. The supercapacitor includes electrode, wherein the electrode is prepared from the abovementioned electrode material.

Furthermore, the supercapacitor is a flexible supercapacitor, and the flexible supercapacitor further comprises: current collector and electrolyte, wherein the current collector is a substrate for preparing the electrode material, or a layer of conductive metal material arranged on the electrode material; and the electrolyte is a solid electrolyte functioning in conduction and bonding among the electrode.

Furthermore, the conductive metal material is Au, Al or Ag.

Furthermore, the solid electrolyte is a mixture of polyvinyl alcohol and an ionic compound, or is a polyvinyl-alcohol-based solid electrolyte.

Furthermore, the supercapacitor is a button supercapacitor, and the button supercapacitor further includes separator, electrolyte solution, negative battery shell cover and positive battery shell cover, the separator and the electrode are arranged in the negative battery shell cover in a sequence of electrode/separator/electrode; the electrolyte solution is filled in the negative battery shell cover; and the positive battery shell cover is buckled to the negative battery shell cover.

Furthermore, the supercapacitor is a wound supercapacitor, and the wound supercapacitor further comprises separator, columnar conductive rods, packaging shell and electrolyte solution, the separator and the electrode are arranged and wound on the two columnar conductive rods to form a blank product in a sequence of electrode/separator/electrode; and the blank product is arranged in the packaging shell filled with the electrolyte solution.

According to another aspect of the disclosure, a preparation method for a button PVDF-based supercapacitor is provided. The preparation method specifically comprises the following steps: (1) preparing a PVDF mixed solution, namely uniformly mixing and drying PVDF and an additive to obtain mixed powder, the additive can be reacted with PVDF to generate a conductive active substance, and dissolving the mixed powder to obtain the mixed solution by virtue of an organic solvent; (2) preparing PVDF-based composite films, namely coating substrate with the mixed solution, obtained in the step (1), of PVDF and the additive which can be reacted with PVDF to generate the conductive active substance, or pouring the mixed solution onto substrate, and drying the mixed solution to obtain the PVDF-based composite film; (3) performing an activating treatment on the PVDF-based composite film to obtain electrode material, namely performing the activating treatment on the PVDF-based composite film obtained in the step (2) by virtue of a physico-chemical process, thereby obtaining the electrode material for the button supercapacitor; and (4) preparing the button supercapacitor, namely adopting the PVDF-based composite film obtained in the step (3) as the electrode material, arranging the electrode material and separator in a negative button battery shell cover in a sequence of electrode material/separator/electrode material, filling electrolyte solution into the negative battery shell cover, then buckling a positive battery shell cover to the negative battery shell cover, and finally packaging the button device on a battery packaging machine to obtain the button supercapacitor.

Furthermore, conductive flexible substrate which is graphite paper, carbon paper, nickel foam, aluminium foil or conductive fibre cloth is adopted as current collector, and the electrolyte solution filled in the negative button battery shell cover is inorganic electrolyte solution, organic electrolyte solution or ionic electrolyte solution.

According to another aspect of the disclosure, a preparation method for a wound PVDF-based supercapacitor is provided. The preparation method specifically comprises the following steps: (1) preparing a PVDF mixed solution, namely uniformly mixing and drying PVDF and an additive, to obtain mixed powder, the additive can be reacted with PVDF to generate a conductive active substance according to a mass proportion, and dissolving the mixed powder to obtain the mixed solution by virtue of an organic solvent; (2) preparing PVDF-based composite film, namely coating substrate with the mixed solution, obtained in step (1), of PVDF and the additive which can be reacted with PVDF to generate the conductive active substance, or pouring the mixed solution onto substrate, and drying the substrates to obtain the PVDF-based composite film; (3) performing an activating treatment on the PVDF-based composite film to obtain electrode materials, namely performing the activating treatment on the PVDF-based composite film obtained in the step (2) by virtue of a physico-chemical process, thereby obtaining the electrode material for the wound supercapacitor; (4) obtaining a wound supercapacitor blank product, namely adopting the PVDF-based composite film obtained in the step (3) as the electrode material, arranging the electrode material and a separator between two columnar conductive rods in a sequence of electrode material/separator/electrode material, and performing winding to obtain the blank product in a way that the electrode material are closely attached to the columnar conductive rods; and (5) preparing the wound supercapacitor, namely placing the wound blank product in a packaging shell with an upper inner cover and a lower inner cover, and performing packaging to obtain the wound supercapacitor after inorganic electrolyte solution, organic electrolyte solution or ionic electrolyte solution is filled.

By the technical schemes of the disclosure, the raw materials for preparing the electrode material comprise PVDF and the additive which can be reacted with PVDF to generate the conductive active substance, and the PVDF-based composite film can be prepared from the raw materials; and the activating treatment is performed on the film by virtue of the physico-chemical process, so that PVDF can generate the conductive active substance, the contact resistance of PVDF and the active substance is reduced, and the conductive active substance is distributed in the PVDF-based composite film more uniformly. The electrode material of the disclosure is higher in flexibility and small in thickness; and the button supercapacitor and wound supercapacitor and flexible capacitor, which are prepared from the electrode material, are high in power density and energy density, long in cycle life, low in cost, simple in process and suitable for large-scale production and application.

BRIEF DESCRIPTION OF THE DRAWINGS

The drawings forming a part of the disclosure are adopted to provide further understanding of the disclosure, and the schematic embodiments and description of the disclosure are adopted to explain the disclosure, and do not form improper limits to the disclosure. In the drawings.

DETAILED DESCRIPTION OF THE EMBODIMENTS

It should be noted that the embodiments of the disclosure and the characteristics in the embodiments can be combined under the condition of no conflicts. The disclosure is described below with reference to the drawings and the embodiments in detail.

According to a typical implementation mode of the disclosure, an electrode material is provided. Raw materials for preparing the electrode material comprise PVDF and an additive, the additive can be reacted with PVDF to generate a conductive active substance, wherein the amount of PVDF is 50 to 99 mass percentage, and the amount of the additive is 1 to 50 mass percentage.

Furthermore, the additive is one selected from a potassium salt, potassium hydroxide and a strong oxidizing substance. The "strong oxidizing substance" in the disclosure refers to a substance, potassium permanganate, for example, capable of initiating the reaction of PVDF to generate the active substance.

According to a typical implementation mode of the disclosure, a preparation method for an electrode material is provided. The preparation method comprises the following steps: (1) dissolving PVDF and an additive to obtain a mixed solution by virtue of an organic solvent, the additive can be reacted with PVDF to generate a conductive active substance, wherein based on the sum of the polyvinylidene fluoride and the additive, the amount of PVDF is 50 to 99 mass percentage, and the amount of the additive is 1 to 50 mass percentage; (2) coating a substrate with the mixed solution obtained in the step (1), and drying the mixed solution to prepare a PVDF-based composite film; and (3) performing an activating treatment on the PVDF-based composite film obtained in the step (2) to obtain the electrode material.

The direct addition of the active substance into the electrode material prepared by the method of the disclosure is avoided; and the electrode material can be processed into any size, its thickness is approximately 25 to 120 microns, a requirement of miniaturization of a device is met, and an application range is widened, such as 15 to 150 microns.

Preferably, the step (1) includes: uniformly mixing PVDF and the additive to obtain a mixed powder, and dissolving the mixed powder to obtain the mixed solution by virtue of the organic solvent. Preferably, the additive is one or more selected from potassium salt, potassium hydroxide and strong oxidizing substance. Preferably, the organic solvent is one selected from N,N-DMF, DMSO and N-NMP.

Preferably, the activating treatment comprises the following steps: performing a heat treatment on the PVDF-based composite film for 1 to 120 minutes at 80° C. to 250° C., then impregnating the PVDF-based composite film in an aqueous solution or alcoholic solution for 1 to 600 minutes, the aqueous solution or alcoholic solution is a solution of potassium hydroxide, sodium hydroxide, lithium hydroxide or potassium permanganate, and finally performing a heat treatment on the PVDF-based composite film for 1 to 120 minutes at 80° C. to 250° C. The enlargement of specific surface areas of electrodes and the addition of porous structures for ion transmission are facilitated. Preferably, the aqueous solution or alcoholic solution of potassium hydroxide, sodium hydroxide, lithium hydroxide or potassium permanganate is at a concentration of 0.5 to 17.5 mol/L.

Preferably, the activating treatment comprises the following step: depositing one or more metal selected from Au, Ag, Al, Fe and Ni on the PVDF-based composite film. Preferably, a film sputtering deposition method is used for depositing one or more metal selected from Au, Ag, Al and Fe on the PVDF-based composite film; or an electroplating method is used for depositing one or more metal selected from Ag, Ni, Fe and Cu on the PVDF-based composite film. Preferably, a material of the substrate is one selected from graphite paper, carbon paper, conductive fibre cloth, aluminium foil, nickel foam, copper foil and glass.

According to a typical implementation mode of the disclosure, a supercapacitor is provided. The supercapacitor comprises electrode, the electrode is prepared from the electrode material.

Preferably, the supercapacitor is a flexible supercapacitor, and the flexible supercapacitor further comprises: current collector and electrolyte, wherein the current collector is a substrate for preparing the electrode material, or a layer of conductive metal material arranged on the electrode material; and the electrolyte is a solid electrolyte functioning in conduction and bonding among the electrode. Preferably, the conductive metal material is Au, Al or Ag. Preferably, the solid electrolyte is a mixture of polyvinyl alcohol and an ionic compound, or is a polyvinyl-alcohol-based solid electrolyte.

Preferably, the supercapacitor is a button supercapacitor, and the button supercapacitor further comprises separator, electrolyte solution, negative battery shell cover and positive battery shell cover, the separator and the electrode are arranged in the negative battery shell cover in a sequence of electrode/separator/electrode; the electrolyte solution is filled in the negative battery shell cover; and the positive battery shell cover is buckled to the negative battery shell cover.

Preferably, the supercapacitor is a wound supercapacitor, and the wound supercapacitor further includes separator, columnar conductive rod, packaging shell and electrolyte solution, the separator and the electrode are arranged and wound on the two columnar conductive rods to form a blank product in a sequence of electrode/separator/electrode; and the blank product is arranged in the packaging shell filled with the electrolyte solution.

According to a typical implementation mode of the disclosure, a preparation method for a button PVDF-based supercapacitor is provided. The preparation method specifically comprises the following steps: (1) preparing a PVDF mixed solution, namely uniformly mixing and drying PVDF and an additive to obtain mixed powder, the additive can be reacted with PVDF to generate a conductive active substance, and dissolving the mixed powder to obtain the mixed solution by virtue of an organic solvent; (2) preparing PVDF-based composite film, namely coating substrate with the mixed solution, obtained in the step (1), of PVDF and the additive which can be reacted with PVDF to generate the conductive active substance, or pouring the mixed solution onto substrate, and drying the mixed solution to obtain the PVDF-based composite film; (3) performing an activating treatment on the PVDF-based composite film to obtain electrode material, namely performing the activating treatment on the PVDF-based composite films obtained in the step (2) by virtue of a physico-chemical process, thereby obtaining the electrode material for the button supercapacitor; and (4) preparing the button supercapacitor, namely adopting the PVDF-based composite film obtained in the step (3) as the electrode material, arranging the electrode material and separator in a negative button battery shell cover in a sequence of electrode material/separator/electrode material, filling electrolyte solution into the negative battery shell cover, then buckling positive battery shell cover to the negative battery shell cover, and finally packaging the button device on a battery packaging machine to obtain the button supercapacitor.

Preferably, conductive flexible substrate which is graphite paper, carbon paper, nickel foam, aluminium foil or conductive fibre cloth is adopted as current collector, and the electrolyte solution filled in the negative button battery shell cover is inorganic electrolyte solution, organic electrolyte solution or ionic electrolyte solution.

According to a typical implementation mode of the disclosure, a preparation method for a wound PVDF-based supercapacitor is provided. The preparation method specifically comprises the following steps: (1) preparing a PVDF mixed solution, namely uniformly mixing and drying PVDF and an additive to obtain mixed powder, the additive can be reacted with PVDF to generate a conductive active substance according to a mass proportion, and dissolving the mixed powder to obtain the mixed solution by virtue of an organic solvent; (2) preparing PVDF-based composite film, namely coating substrate with the mixed solution, obtained in the step (1), of PVDF and the additive which can be reacted with PVDF to generate the conductive active substance, or pouring the mixed solution onto substrate, and drying the mixed solution to obtain the PVDF-based composite films; (3) performing an activating treatment on the PVDF-based composite film to obtain electrode material, namely performing the activating treatment on the PVDF-based composite films obtained in the step (2) by virtue of a physico-chemical process, thereby obtaining the electrode material for the wound supercapacitor; (4) obtaining a wound supercapacitor blank product, namely adopting the PVDF-based composite film obtained in the step (3) as the electrode material, arranging the electrode material and separator between two columnar conductive rods in a sequence of electrode material/separator/electrode material, and performing winding to obtain the blank product in a way that the electrode material are closely attached to the columnar conductive rods; and (5) preparing the wound supercapacitor, namely placing the wound blank product in a packaging shell with an upper inner cover and a lower inner cover, and performing packaging to obtain the wound supercapacitor after inorganic electrolyte solution, organic electrolyte solution or ionic electrolyte solution is filled.

Beneficial effects of the disclosure are further described below with reference to the embodiments.

In the embodiments of the disclosure, an adopted constant temperature drying box is a KXH101-2A type constant temperature drying box produced by Shanghai Kexi Experimental Instrument Plant.

adopted PVDF is produced by Chengdu ZF Chemicals Co., Ltd.; and an electrochemical workstation for test results is CS3500 electrochemical workstation of Wuhan Corrtest Instruments Co., Ltd.

Embodiment 1

Figure 1:
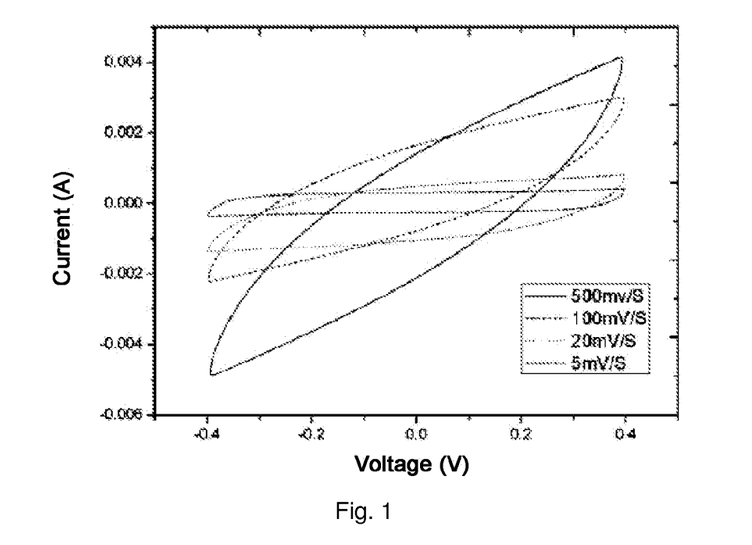
FIG. 1 shows a cyclic voltammetry test result of a flexible supercapacitor prepared in embodiment 1 of the disclosure.
Figure 2:
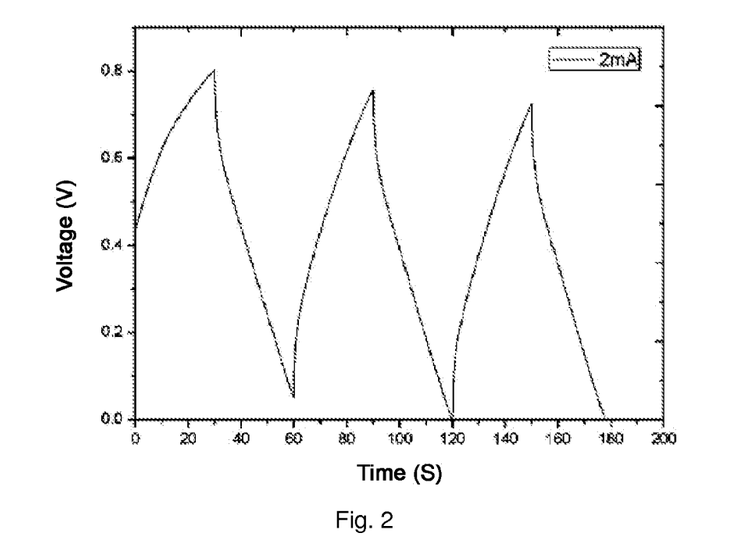
FIG. 2 shows galvanostatic charge/discharge test result of a flexible supercapacitor prepared in embodiment 1 of the disclosure.

PVDF and potassium carbonate were weighed according to a mass proportion of 77%:23%, the weighed raw materials were uniformly mixed, and the uniformly mixed raw materials were completely dissolved to obtain a sol-like mixed solution by virtue of a DMF solvent; graphite paper substrates were uniformly coated with the mixed solution, and a layer of composite film was formed on each graphite paper substrate after the graphite paper substrates were dried by a constant temperature drying box; the composite films were subjected to heat treatment for 60 minutes at 220° C., the composite films subjected to heat treatment were impregnated for 30 minutes in a 17.5 mol/L aqueous solution of potassium hydroxide, and after being taken out, the impregnated composite films were subjected to activating treatment for 30 minutes at 200° C. to prepare PVDF-based composite films which were electrode materials for a flexible supercapacitor; and two opposite electrodes were bonded to prepare the flexible supercapacitor employing the graphite paper substrates bearing the films as current collectors, employing the PVDF-based electrode materials as the electrodes and employing a mixed electrolyte solution of polyvinyl alcohol and potassium hydroxide as a solid electrolyte by using a mixed solution of polyvinyl alcohol and a potassium hydroxide electrolyte as a bonding agent. An electrochemical workstation was used for testing its cyclic voltammetry and constant current charging and discharging, test results were shown in FIG. 1 and FIG. 2, and as shown in FIG. 2, the specific capacity is approximately 65.61 F/g, the energy density is approximately 1.62 Wh/kg, the maximum power density is approximately 63.97 kW/kg, and the area specific capacity is approximately 75 µF/cm$^2$.

Embodiment 2

PVDF and potassium carbonate were weighed according to a mass proportion of 99%:1%, the weighed raw materials were uniformly mixed, and the uniformly mixed raw materials were completely dissolved to obtain a sol-like mixed solution by virtue of an NMP solvent; aluminium foil substrates were uniformly coated with the mixed solution, and a layer of composite film is formed on each aluminium foil substrate after the aluminium foil substrates were dried by a constant temperature drying box; the composite films were subjected to heat treatment for 1 minute at 250° C., the composite films subjected to heat treatment were impregnated for 600 minutes in a 5 mol/L alcoholic solution of potassium hydroxide, and after being taken out, the impregnated composite films were subjected to activating treatment for 1 minute at 250° C. to prepare PVDF-based composite films which were electrode materials for a flexible supercapacitor; and two opposite electrodes were bonded to prepare the flexible supercapacitor employing the aluminium foil substrates bearing the films as current collectors, employing the PVDF-based electrode materials as the electrodes and employing a mixed electrolyte solution of polyvinyl alcohol and potassium hydroxide as a solid electrolyte by using a mixed solution of polyvinyl alcohol and a potassium hydroxide electrolyte as a bonding agent, wherein the specific capacity is approximately 46.32 F/g, the energy density is approximately 0.91 Wh/kg, the maximum power density is approximately 51.23 kW/kg, and the area specific capacity is approximately 61 µF/cm$^2$.

Embodiment 3

Figure 3:
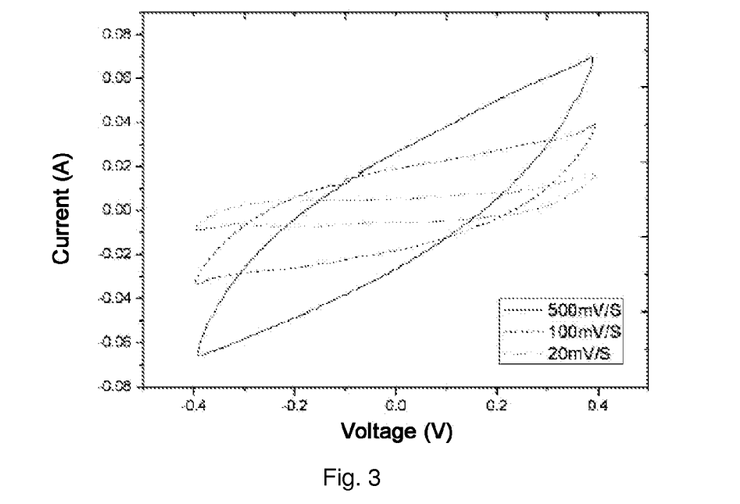
FIG. 3 shows a cyclic voltammetry test result of a flexible supercapacitor prepared in embodiment 3 of the disclosure.
Figure 4:
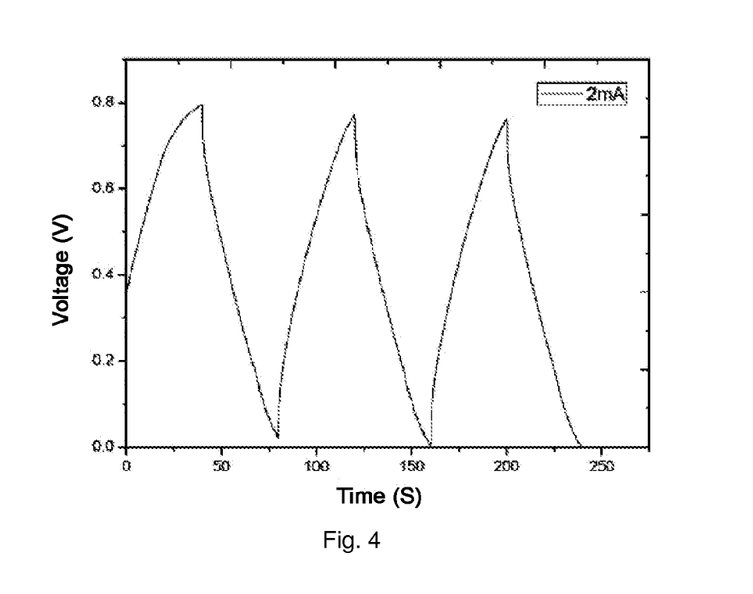
FIG. 4 shows galvanostatic charge/discharge test result of a flexible supercapacitor prepared in embodiment 3 of the disclosure.

PVDF and potassium carbonate were weighed according to a mass proportion of 50%:50%, the weighed raw materials were uniformly mixed, and the uniformly mixed raw materials were completely dissolved to obtain a sol-like mixed solution by virtue of a DMSO solvent; nickel foam substrates were uniformly coated with the mixed solution, and a layer of composite film is formed on each nickel foam substrate after the nickel foam substrates were dried by a constant temperature drying box; the composite films were subjected to heat treatment for 120 minutes at 80° C., the composite films subjected to heat treatment were impregnated for 600 minutes in a 5 mol/L alcoholic solution of potassium hydroxide, and after being taken out, the impregnated composite films were subjected to activating treatment for 120 minutes at 80° C. to prepare PVDF-based composite films which were electrode materials for a flexible supercapacitor; and two opposite electrodes were bonded to prepare the flexible supercapacitor employing the nickel foam substrates bearing the films as current collectors, employing the PVDF-based electrode materials as the electrodes and employing a mixed electrolyte solution of polyvinyl alcohol and potassium hydroxide as a solid electrolyte by using a mixed solution of polyvinyl alcohol and a potassium hydroxide electrolyte as a bonding agent. Test results were shown in FIG. 3 and FIG. 4, and as shown in FIG. 4, the specific capacity is approximately 58.78 F/g, the energy density is approximately 1.58 Wh/kg, the maximum power density is approximately 60.26 kW/kg, and the area specific capacity is approximately 68 µF/cm$^2$.

Embodiment 4

PVDF and potassium carbonate were weighed according to a mass proportion of 60%:40%, the weighed raw materials were uniformly mixed, and the uniformly mixed raw materials were completely dissolved to obtain a sol-like mixed solution by virtue of a DMF solvent; and glass substrates were uniformly coated with the mixed solution, and a layer of composite film is formed on each glass substrate after the glass substrates were dried by a constant temperature drying box.

The composite films were taken down, and were subjected to heat treatment for 100 minutes at 120° C., and both surfaces of the composite films subjected to heat treatment were plated with metal Au to prepare PVDF-based composite films which were electrode materials for a flexible supercapacitor by virtue of a sputtering method; and current collector, prepared by the glass substrates, of PVDF-based film electrodes were conductive metal materials Au plated on back surfaces of the PVDF-based film electrodes.

Figure 5:
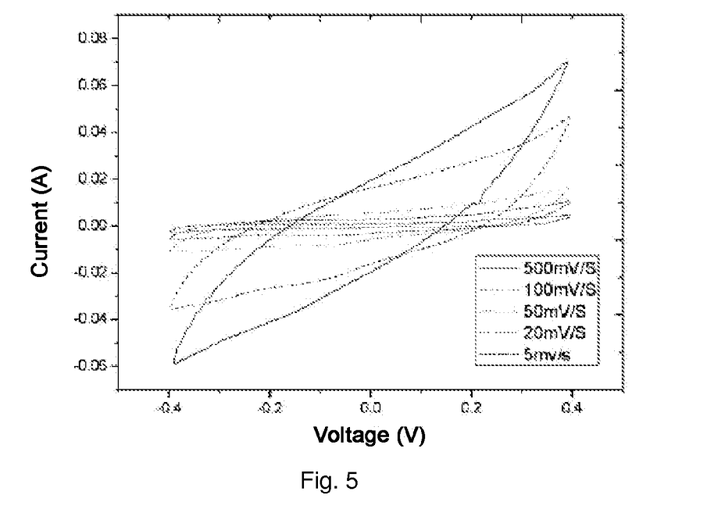
FIG. 5 shows a cyclic voltammetry test result of a flexible supercapacitor prepared in embodiment 4 of the disclosure.
Figure 6:
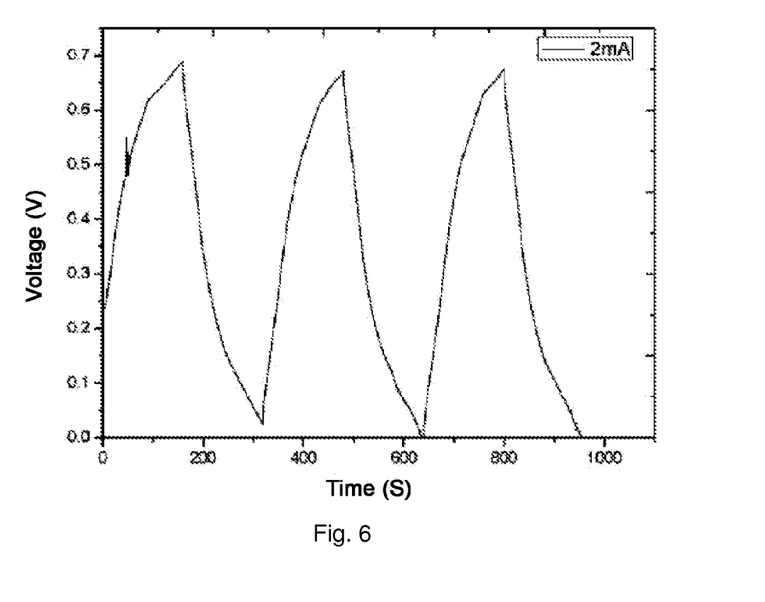
FIG. 6 shows galvanostatic charge/discharge test result of a flexible supercapacitor prepared in embodiment 4 of the disclosure.

The two opposite electrodes were bonded by using a mixed solution of polyvinyl alcohol and a phosphoric acid electrolyte as a bonding agent, and both surfaces of the prepared prototype device were plated with metal Au as the current collectors by virtue of the sputtering method, and a flexible supercapacitor employing Au electrodes as the current collectors, employing the PVDF-based electrode materials as the electrodes and employing a mixed electrolyte solution of polyvinyl alcohol and the phosphoric acid electrolyte as a solid electrolyte was obtained. Test results were shown in FIG. 5 and FIG. 6, and as shown in FIG. 6, the specific capacity is approximately 35 F/g, the energy density is approximately 0.86 Wh/kg, the maximum power density is approximately 34.65 kW/kg, and the area specific capacity is approximately 10 µF/cm$^2$.

Embodiment 5

PVDF and potassium carbonate were weighed according to a mass proportion of 80%:20%, the weighed raw materials were uniformly mixed, and the uniformly mixed raw materials were completely dissolved to obtain a sol-like mixed solution by virtue of a DMF solvent; glass substrates were uniformly coated with the mixed solution, and a layer of composite film is formed on each glass substrate after the glass substrates were dried by a constant temperature drying box; the composite films were taken down, and were subjected to heat treatment for 60 minutes at 160° C., and both surfaces of the composite films subjected to heat treatment were plated with metal Ni to prepare PVDF-based composite films which were electrode materials for a flexible supercapacitor by virtue of a electroplating method; and two opposite electrodes were bonded by using a mixed solution of polyvinyl alcohol and a phosphoric acid electrolyte as a bonding agent, and both surfaces of the prepared prototype device were plated with metal Al as current collectors by virtue of the sputtering method, and a flexible supercapacitor employing Al electrodes as the current collectors, employing the PVDF-based electrode materials as the electrodes and employing a mixed electrolyte solution of polyvinyl alcohol and the phosphoric acid electrolyte as a solid electrolyte was obtained, wherein the specific capacity is approximately 53.41 F/g, the energy density is approximately 1.13 Wh/kg, the maximum power density is approximately 56.71 kW/kg, and the area specific capacity is approximately 63 µF/cm².

Embodiment 6

PVDF and potassium carbonate were weighed according to a mass proportion of 90%:10%, the weighed raw materials were uniformly mixed, and the uniformly mixed raw materials were completely dissolved to obtain a sol-like mixed solution by virtue of an NMP solvent; graphite paper substrates were uniformly coated with the mixed solution, and a layer of composite film is formed on each graphite paper substrate after the graphite paper substrates were dried by a constant temperature drying box; the composite films were taken down, and were subjected to heat treatment for 80 minutes at 200° C., and both surfaces of the composite films subjected to heat treatment were plated with metal Fe to prepare PVDF-based composite films which were electrode materials for a flexible supercapacitor by virtue of a electroplating method; and two opposite electrodes were bonded by using a mixed solution of polyvinyl alcohol and a phosphoric acid electrolyte as a bonding agent, and both surfaces of the prepared prototype device were plated with metal Ag as current collectors by virtue of the sputtering method, and a flexible supercapacitor employing Ag electrodes as the current collectors, employing the PVDF-based electrode materials as the electrodes and employing a mixed electrolyte solution of polyvinyl alcohol and the phosphoric acid electrolyte as a solid electrolyte is obtained, wherein the specific capacity is approximately 65.61 F/g, the energy density is approximately 1.62 Wh/kg, the maximum power density is approximately 63.97 kW/kg, and the area specific capacity is approximately 75 µF/cm².

According to the disclosure, the using amounts of PVDF and the additive, the material of the substrate, heat treatment temperature and deposited metal materials can be changed, a process and process steps of the preparation method are the same as those in any embodiment, the electrode materials for the flexible supercapacitor can be prepared, and the direct addition of the active substance into the electrode material is avoided; and the flexible supercapacitor prepared from the electrode materials is high in charging and discharging performance and speed and long in cycle life, and can be bent and folded, and its smallest thickness can reach 200 µm. The flexible supercapacitor is consistent with the development of miniaturization and lightweight of the device, and its application range is widened.

Embodiment 7

Figure 7:
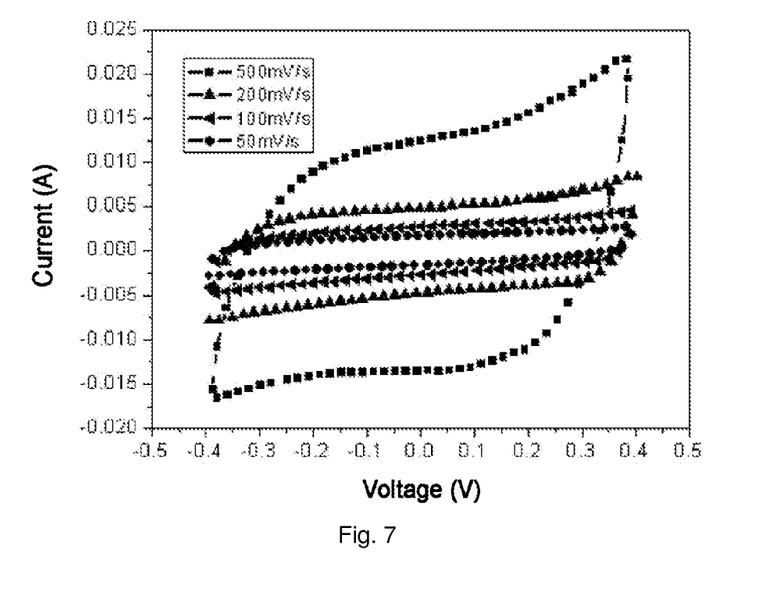
FIG. 7 shows a cyclic voltammetry test result of a button supercapacitor prepared in embodiment 7 of the disclosure.
Figure 8:
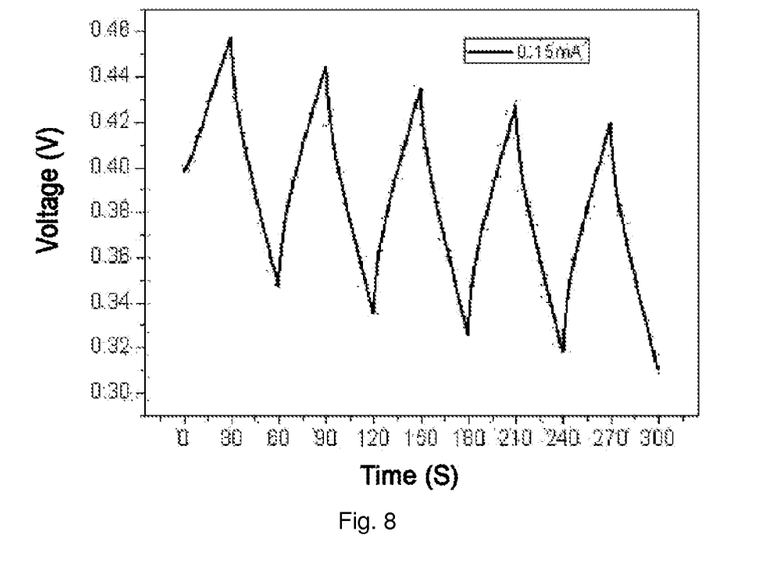
FIG. 8 shows galvanostatic charge/discharge test result of a button supercapacitor prepared in embodiment 7 of the disclosure.

PVDF and $K_2CO_3$ were weighed according to a mass proportion of 73%:27%, the weighed raw materials were uniformly mixed and dried to obtain powder, and the powder was completely dissolved to obtain a mixed solution by virtue of 10 mL of DMF solvent; and graphite paper substrates were uniformly coated with the mixed to solution, and were placed in a constant temperature drying box for 15 hours, and after the graphite paper substrates were taken out, a layer of PVDF-based composite film was formed on each graphite paper substrate. The PVDF-based composite films were subjected to heat treatment for 60 minutes at 220° C., and the composite films subjected to heat treatment were impregnated for 30 minutes in a 10 mol/L solution of potassium hydroxide, and then were subjected to activating treatment for 60 minutes at 200° C. to prepare PVDF-based film electrode materials for a supercapacitor. The PVDF-based film electrode materials were processed into wafers with certain sizes, and a separator was cut into a shape similar to the wafer and slightly larger than the wafer; the wafers were packaged in a negative button battery shell cover in form of film/separator/film after a 6 mol/L solution of potassium hydroxide is filled into the negative battery shell cover; a positive battery shell cover was buckled to the negative battery shell cover; and the button device was packaged on a battery packaging machine to obtain a button PVDF-based supercapacitor. An electrochemical workstation was used for testing cyclic voltammetry and constant current charging and discharging of the button supercapacitor, test results were shown in FIG. 7 and FIG. 8, and as shown in FIG. 8, the specific capacity is approximately 28.61 F/g, the energy density is approximately 0.81 Wh/kg, and the maximum power density is approximately 43.25 kW/kg.

Embodiment 8

PVDF and $K_2CO_3$ were weighed according to a mass proportion of 99%:1%, the weighed raw materials were uniformly mixed and dried to obtain powder, and the powder was completely dissolved to obtain a mixed solution by virtue of 10 mL of DMF solvent; and conductive fibre cloth substrates were uniformly coated with the mixed solution, and were placed in a constant temperature drying box for 15 hours, and after the conductive fibre cloth substrates were taken out, a layer of PVDF-based composite film was formed on each conductive fibre cloth substrate. The PVDF-based composite films were subjected to heat treatment for 1 minute at 250° C., and the composite films subjected to heat treatment were impregnated for 1 minute in a 6 mol/L solution of potassium hydroxide, and then were subjected to activating treatment for 1 minute at 250° C. to prepare PVDF-based film electrode materials for a supercapacitor. The PVDF-based film electrode materials were processed into wafers with certain sizes, and a separator is cut into a shape similar to the wafer and slightly larger than the wafer; the wafers were packaged in a negative button battery shell cover in form of film/separator/film after the 6 mol/L solution of potassium hydroxide was filled into the negative battery shell cover; a positive battery shell cover was buckled to the negative battery shell cover; and the button device was packaged on a battery packaging machine to obtain a button PVDF-based supercapacitor, wherein the specific capacity is approximately 19.36 F/g, the energy density is approximately 0.78 Wh/kg, and the maximum power density is approximately 46.32 kW/kg.

Embodiment 9

PVDF and $K_2CO_3$ were weighed according to a mass proportion of 50%:50%, the weighed raw materials were uniformly mixed and dried to obtain powder, and the powder is completely dissolved to obtain a mixed solution by virtue of 10 mL of NMP solvent; and the mixed solution is uniformly poured onto glass substrates, the glass substrates were placed in a constant temperature drying box for 15 hours, and after the glass substrates were taken out, a layer of PVDF-based composite film was formed on each glass substrate. The PVDF-based composite films were subjected to heat treatment for 120 minutes at 80° C., and the composite films subjected to heat treatment were impregnated for 60 minutes in a 1 mol/L solution of sodium hydroxide, and then were subjected to activating treatment for 120 minutes at 80° C. to prepare PVDF-based film electrode materials for a supercapacitor. The PVDF-based film electrode materials were processed into wafers with certain sizes, and a separator was cut into a shape similar to the wafer and slightly larger than the wafer; the wafers were packaged in a negative button battery shell cover in form of film/separator/film after a 6 mol/L solution of potassium hydroxide was filled into the negative battery shell cover; a positive battery shell cover was buckled to the negative battery shell cover; and the button device was packaged on a battery packaging machine to obtain a button PVDF-based supercapacitor, wherein the specific capacity is approximately 31.12 F/g, the energy density is approximately 0.83 Wh/kg, and the maximum power density is approximately 46.13 kW/kg.

Embodiment 10

Figure 9:
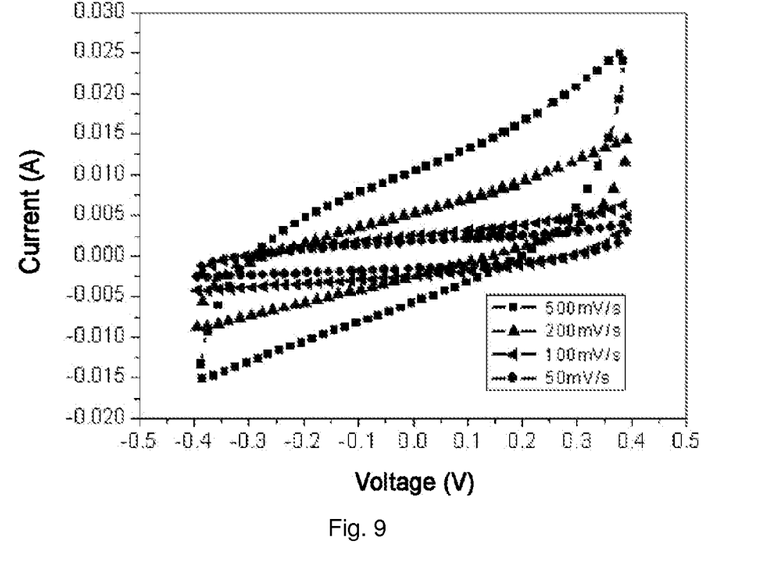
FIG. 9 shows a cyclic voltammetry test result of a wound supercapacitor prepared in embodiment 10 of the disclosure.
Figure 10:
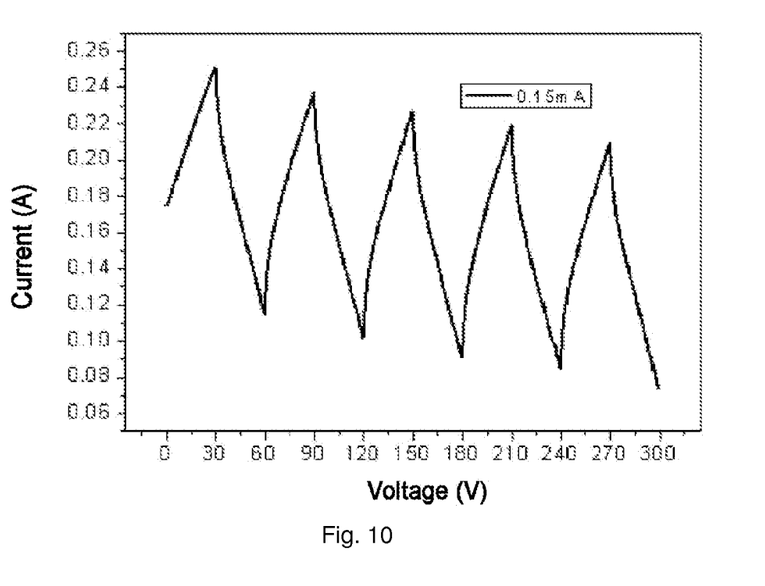
FIG. 10 shows galvanostatic charge/discharge test result of a wound supercapacitor prepared in embodiment 10 of the disclosure.

PVDF and $K_2CO_3$ were weighed according to a mass proportion of 73%:27%, the weighed raw materials were uniformly mixed and dried to obtain powder, and the powder is completely dissolved to obtain a mixed solution by virtue of 10 mL of NMP solvent; and nickel foam substrates were uniformly coated with the mixed solution, and were placed in a constant temperature drying box for 15 hours, and after the graphite paper substrates were taken out, a layer of PVDF-based composite film was formed on each nickel foam substrate. The PVDF-based composite films were subjected to heat treatment for 60 minutes at 220° C., and the composite films subjected to heat treatment were impregnated for 100 minutes in a 3 mol/L solution of lithium hydroxide, and then were subjected to activating treatment for 60 minutes at 200° C. to prepare PVDF-based film electrode materials for a supercapacitor. The PVDF-based film electrode materials and a separator were cut into long strips, and then were arranged and wound between two columnar conductive metal rods in a sequence of electrode/separator/electrode in a way that the electrode materials were closely attached to the columnar conductive metal rods to obtain a blank product; and the wound blank product was arranged in a packaging shell with an upper inner cover and a lower inner cover, a 6 mol/L solution of potassium hydroxide was filled, and the blank product was packaged to obtain a wound supercapacitor. An electrochemical workstation was used for testing cyclic voltammetry and constant current charging and discharging of the wound supercapacitor, test results were shown in FIG. 9 and FIG. 10, the specific capacity is approximately 35.66 F/g, the energy density is approximately 1.82 Wh/kg, and the maximum power density is approximately 46.58 kW/kg.

Embodiment 11

PVDF and $K_2CO_3$ were weighed according to a mass proportion of 99%:1%, the weighed raw materials were uniformly mixed and dried to obtain powder, and the powder is completely dissolved to obtain a mixed solution by virtue of 10 mL of DMSO solvent; and the mixed solution is uniformly poured onto glass substrates, the glass substrates were placed in a constant temperature drying box for 15 hours, and after the glass substrates were taken out, a layer of PVDF-based composite film is formed on each glass substrate. The PVDF-based composite films were subjected to heat treatment for 1 minute at 250° C., and the composite films subjected to heat treatment were impregnated for 80 minutes in a 5 mol/L alcoholic solution of sodium hydroxide, and then were subjected to activating treatment for 1 minute at 250° C. to prepare PVDF-based film electrode materials for a supercapacitor. The PVDF-based film elec-trode materials and a separator were cut into long strips, and then were to arranged and wound between two columnar conductive metal rods in a sequence of electrode/separator/electrode in a way that the electrode materials were closely attached to the columnar conductive metal rods to obtain a blank product; and the wound blank product was arranged in a packaging shell with an upper inner cover and a lower inner cover, a 6 mol/L solution of potassium hydroxide was filled, and the blank product was packaged to obtain a wound supercapacitor, wherein the specific capacity is approximately 46.23 F/g, the energy density is approximately 1.59 Wh/kg, and the maximum power density is approximately 44.51 kW/kg.

Embodiment 12

PVDF and $K_2CO_3$ were weighed according to a mass proportion of 50%:50%, the weighed raw materials were uniformly mixed and dried to obtain powder, and the powder is completely dissolved to obtain a mixed solution by virtue of 10 mL of DMSO solvent; and aluminium foil substrates were uniformly coated with the mixed solution, the aluminium foil substrates were placed in a constant temperature drying box for 15 hours, and after the aluminium foil substrates were taken out, a layer of PVDF-based composite film is formed on each aluminium foil substrate. The PVDF-based composite films were subjected to heat treatment for 120 minutes at 80° C., and the composite films subjected to heat treatment were impregnated for 60 minutes in a 4 mol/L alcoholic solution of lithium hydroxide, and then were subjected to activating treatment for 120 minutes at 80° C. to prepare PVDF-based film electrode materials for a supercapacitor. The PVDF-based film electrode materials and a separator were cut into long strips, and then were arranged and wound between two columnar conductive metal rods in a sequence of electrode/separator/electrode in a way that the electrode materials were closely attached to the columnar conductive metal rods to obtain a blank product; and the wound blank product was arranged in a packaging shell with an upper inner cover and a lower inner cover, a 6 mol/L solution of potassium hydroxide was filled, and the blank product was packaged to obtain a wound supercapacitor, wherein the specific capacity is approximately 47.03 F/g, the energy density is approximately 1.69 Wh/kg, and the maximum power density is approximately 41.07 kW/kg.

According to the embodiments, the button supercapacitors, wound supercapacitors and the flexible capacitors in the disclosure directly employ the PVDF-based composite film materials as the electrode materials; and the prepared film material is subjected to the activating treatment by virtue of the physico-chemical process, so that PVDF can generate the conductive active substance, the contact resistance of PVDF and the active substance is reduced, and the conductive active substance is distributed in the PVDF-based composite film more uniformly. Meanwhile, the PVDF-based composite film material is endowed with a porous structure by virtue of a heating treatment process, so that the specific surface area of the electrode material can be enlarged more simply, and the capacitance of the supercapacitor can be improved. The electrode material for the capacitor is higher in flexibility and smaller in thickness; and the button supercapacitors, wound supercapacitors and flexible capacitors, which were prepared from the electrode material, are high in power density and energy density, long in cycle life, low in cost, simple in process and suitable for large-scale production and application.

The above is only the preferred embodiment of the disclosure and not intended to limit the disclosure, and for those skilled in the art, the disclosure can have various modifications and variations. Any modifications, equivalent replacements, improvements and the like within the spirit and principle of the disclosure shall fall within the scope of protection of the disclosure.

What is claimed is:

1. An electrode material, wherein the electrode material comprises a conductive active substance and raw materials for preparing the electrode material comprise polyvinylidene fluoride and an additive, the conductive active substance is generated by reaction between the additive and the polyvinylidene fluoride; and the amount of the polyvinylidene fluoride is 50 to 99 mass percentage, and the amount of the additive is 1 to 50 mass percentage, the additive is one selected from potassium carbonate, potassium hydroxide and a strong oxidizing substance.

2. A supercapacitor, comprising an electrode, wherein the electrode is prepared from the electrode material according to claim 1.

3. The supercapacitor according to claim 2, wherein the supercapacitor is a button supercapacitor, and the button supercapacitor further comprises a separator, an electrolyte solution, a negative battery shell cover and a positive battery shell cover, the separator and the electrode are arranged in the negative battery shell cover in a sequence of electrode/separator/electrode; the electrolyte solution is filled in the negative battery shell cover; and the positive battery shell cover is buckled to the negative battery shell cover.

4. The supercapacitor according to claim 2, wherein the supercapacitor is a wound supercapacitor, and the wound supercapacitor further comprises a separator, a columnar conductive rod, a packaging shell and an electrolyte solution, the separator and the electrode are arranged and wound on two of the columnar conductive rods to form a blank product in a sequence of electrode/separator/electrode; and the blank product is arranged in the packaging shell filled with the electrolyte solution.

5. The supercapacitor according to claim 2, wherein the supercapacitor is a flexible supercapacitor, and the flexible supercapacitor further comprises: a current collector and an electrolyte, wherein the current collector is a substrate for preparing the electrode material, or a layer of conductive metal material arranged on the electrode material; and the electrolyte is a solid electrolyte functioning in conduction and bonding among the electrode.

6. The supercapacitor according to claim 5, wherein the conductive metal material is Au, Al or Ag.

7. The supercapacitor according to claim 5, wherein the solid electrolyte is a mixture of polyvinyl alcohol and an ionic compound, or is a polyvinyl-alcohol-based solid electrolyte.

8. A preparation method for an electrode material, wherein the preparation method comprises the following steps:
(1) dissolving polyvinylidene fluoride and an additive to obtain a mixed solution of an organic solvent, the additive can be reacted with the polyvinylidene fluoride to generate a conductive active substance, wherein the amount of the polyvinylidene fluoride is 50 to 99 mass percentage, and the amount of the additive is 1 to 50 mass percentage;
(2) coating a substrate with the mixed solution obtained in the step (1), and drying the mixed solution to prepare a PVDF-based composite film; and
(3) performing an activating treatment on the PVDF-based composite film obtained in the step (2) to obtain the electrode material.

9. The preparation method according to claim 8, wherein the step (1) comprises: uniformly mixing the polyvinylidene fluoride and the additive to obtain a mixed powder, and dissolving the mixed powder to obtain the mixed solution by virtue of the organic solvent.

10. The preparation method according to claim 8, wherein the additive is one or more selected from potassium salt, potassium hydroxide and strong oxidizing substance.

11. The preparation method according to claim 8, wherein the organic solvent is one selected from N,N-dimethyl formamide, dimethyl sulfoxide and N-methyl pyrrolidone.

12. The preparation method according to claim 8, wherein the activating treatment comprises the following steps: performing a heat treatment on the PVDF-based composite film for 1 to 120 minutes at 80° C. to 250° C., then impregnating the PVDF-based composite film in an aqueous solution or alcoholic solution for 1 to 600 minutes, wherein the aqueous solution or alcoholic solution is a solution of potassium hydroxide, sodium hydroxide, lithium hydroxide or potassium permanganate, and finally performing a heat treatment on the PVDF-based composite film for 1 to 120 minutes at 80° C. to 250° C.

13. The preparation method according to claim 12, wherein the aqueous solution or alcoholic solution of potassium hydroxide, sodium hydroxide, lithium hydroxide or potassium permanganate is at a concentration of 0.5 to 17.5 mol/L.

14. The preparation method according to claim 8, wherein the activating treatment comprises the following step of: depositing one or more metal selected from Au, Ag, Al, Fe and Ni on the PVDF-based composite film.

15. The preparation method according to claim 14, wherein a film sputtering deposition method is used for depositing one or more metal selected from Au, Ag, Al and Fe on the PVDF-based composite film; or an electroplating method is used for depositing one or more metal selected from Ag, Ni, Fe and Cu on the PVDF-based composite film.

16. The preparation method according to claim 8, wherein a material of the substrate is one selected from graphite paper, carbon paper, conductive fibre cloth, aluminium foil, nickel foam, copper foil and glass.

17. A preparation method for a button polyvinylidene fluoride based supercapacitor, wherein the preparation method comprises the following steps:
(1) preparing a polyvinylidene fluoride mixed solution, by uniformly mixing and drying the polyvinylidene fluoride and an additive, to obtain mixed powder, the additive can be reacted with the polyvinylidene fluoride to generate a conductive active substance, and dissolving the mixed powder to obtain the mixed solution by virtue of an organic solvent;
(2) preparing PVDF-based composite film, by coating substrate with the mixed solution, obtained in the step (1), of the polyvinylidene fluoride and the additive which can be reacted with the polyvinylidene fluoride to generate the conductive active substance, or pouring the mixed solution onto the substrate, and drying the mixed solution to obtain the PVDF-based composite films;
(3) performing an activating treatment on the PVDF-based composite film to obtain electrode material, by performing the activating treatment on the PVDF-based composite film obtained in the step (2) by virtue of a physico-chemical process, thereby obtaining the electrode material for the button supercapacitor; and (4) preparing the button supercapacitor, by adopting the PVDF-based composite film as the electrode material, arranging the electrode material and separator in a negative button battery shell cover in a sequence of electrode material/separator/electrode material, filling electrolyte solution into the negative battery shell cover, then buckling positive battery shell cover to the negative battery shell cover, and finally packaging the button device on a battery packaging machine to obtain the button supercapacitor.

18. The preparation method according to claim 17, wherein conductive flexible substrate which is graphite paper, carbon paper, nickel foam, aluminium foil or conductive fibre cloth is adopted as current collector, and the electrolyte solution filled in the negative button battery shell cover is inorganic electrolyte solution, organic electrolyte solution or ionic electrolyte solution.

19. A preparation method for a wound polyvinylidene fluoride based supercapacitor, wherein the preparation method comprises the following steps:

(1) preparing a polyvinylidene fluoride mixed solution, by uniformly mixing and drying the polyvinylidene fluoride and an additive, to obtain mixed powder, the additive can be reacted with the polyvinylidene fluoride to generate a conductive active substance according to a mass proportion, and dissolving the mixed powder to obtain the mixed solution by virtue of an organic solvent;

(2) preparing PVDF-based composite film, by coating substrate with the mixed solution, obtained in step (1), of the polyvinylidene fluoride and the additive which can be reacted with the polyvinylidene fluoride to generate the conductive active substance, or pouring the mixed solution onto the substrate, and drying the mixed solution to obtain the PVDF-based composite film;

(3) performing an activating treatment on the PVDF-based composite film to obtain electrode material, by performing the activating treatment on the PVDF-based composite films obtained in the step (2) by virtue of a physico-chemical process, thereby obtaining the electrode material for the wound supercapacitor;

(4) obtaining a wound supercapacitor blank product, by adopting the PVDF-based composite film as the electrode material, arranging the electrode material and separator between two columnar conductive rods in a sequence of electrode material/separator/electrode material, and performing winding to obtain the blank product in a way that the electrode material are closely attached to the columnar conductive rods; and (5) preparing the wound supercapacitor, by placing the wound blank product in a packaging shell with an upper inner cover and a lower inner cover, and performing packaging to obtain the wound supercapacitor after inorganic electrolyte solution, organic electrolyte solution or ionic electrolyte solution is filled.

* * * * *